United States Patent
Madeira

(10) Patent No.: US 9,927,145 B2
(45) Date of Patent: Mar. 27, 2018

(54) HEATING SYSTEM WITH HIGH HEAT RETENTION TRANSFER FLUID

(71) Applicant: Ronald H. Madeira, Reading, PA (US)

(72) Inventor: Ronald H. Madeira, Reading, PA (US)

( * ) Notice: Subject to any disclaimer, the term of this patent is extended or adjusted under 35 U.S.C. 154(b) by 185 days.

(21) Appl. No.: 15/139,522

(22) Filed: Apr. 27, 2016

(65) Prior Publication Data

US 2016/0320094 A1    Nov. 3, 2016

Related U.S. Application Data

(60) Provisional application No. 62/155,431, filed on Apr. 30, 2015.

(51) Int. Cl.
| | |
|---|---|
| *F24D 3/02* | (2006.01) |
| *F24H 7/04* | (2006.01) |
| *C09K 5/10* | (2006.01) |
| *F24D 3/10* | (2006.01) |
| *F24D 7/00* | (2006.01) |

(52) U.S. Cl.
CPC ............ *F24H 7/0466* (2013.01); *C09K 5/10* (2013.01); *F24D 3/02* (2013.01); *F24D 3/105* (2013.01); *F24D 7/00* (2013.01)

(58) Field of Classification Search
CPC ... F24D 3/02; F24D 3/105; F24D 7/00; C09K 5/10; C09K 5/20; F24H 7/0466
USPC ..................................... 237/59, 63, 8 A, 8 C
IPC .................... F24D 3/02,7/00; C09K 5/10, 5/20
See application file for complete search history.

(56) References Cited

U.S. PATENT DOCUMENTS

| | | | | |
|---|---|---|---|---|
| 3,815,813 A | * | 6/1974 | Charron | F23N 5/02 236/23 |
| 4,065,054 A | * | 12/1977 | Meier | F24D 3/08 237/19 |
| 4,401,100 A | * | 8/1983 | Slater | F24D 17/0021 126/362.1 |
| 4,999,406 A | * | 3/1991 | Sharaby | C08F 8/14 525/208 |
| 5,119,988 A | * | 6/1992 | Fiedrich | G05D 23/126 237/59 |
| 5,979,781 A | * | 11/1999 | Fiedrich | F24D 10/006 237/59 |
| 8,919,296 B2 | * | 12/2014 | Komori | F24D 3/082 122/13.3 |

FOREIGN PATENT DOCUMENTS

CA           2928295 A1  * 10/2016  ........... F24H 7/0466

* cited by examiner

*Primary Examiner* — Gregory Huson
*Assistant Examiner* — Daniel E Namay
(74) *Attorney, Agent, or Firm* — Miller Law Group, PLLC

(57) ABSTRACT

A heating system combines a heat source for applying heat energy to a supply of heat transfer fluid including a polyol having five or less pendant hydroxyl groups and a polydimethylsiloxane and a pump that moves the heat transfer fluid through conduits to a heat exchanger. In one configuration, the heating system has a primary circuit including the heat source, delivery line, pump, heat exchanger and return line, and a sub-circuit including a bypass line interconnecting the delivery line and the return line to provide a flow path bypassing the heat source. The sub-circuit includes the bypass line, a portion of the delivery line, the pump, the heat exchanger, and a portion of the return line. Control valves and a control mechanism direct the flow of fluid between the primary and sub-circuit. The heat transfer fluid is a blended mixture of 5-15% glycerin, 20-40% propyl glycol and 45-75% silicone.

13 Claims, 4 Drawing Sheets

HEATING SYSTEM WITH HIGH HEAT RETENTION TRANSFER FLUID

CROSS-REFERENCE TO RELATED APPLICATIONS

This application claims domestic priority on U.S. Provisional Patent Application Ser. No. 62/155,431, filed on Apr. 30, 2015, the content of which is incorporated herein by reference.

FIELD OF THE INVENTION

This invention relates generally to a heating system for use in residential, commercial and industrial applications, and more particularly, to a closed loop heating system with a unique heat transfer medium circulating between a heat source and the area to be heated with a heat conserving sub-loop for circulation.

BACKGROUND OF THE INVENTION

Conventional residential heating systems utilize a heating source, such as an oil or gas furnace that uses a flame or electric systems that use resistance heating elements, to heat a transfer medium that carries heat into the area to be heated. Many furnaces using fossil fuels to generate heat apply that heat to water that is then circulated to heat exchangers within the area to be heated such that heat energy is extracted from the heated water and used to warm the air within the area to be heated. Water is generally the choice for the heat transfer medium as water is readily available and is inexpensive. However, water will freeze and expand at 32° F. (0° C.) and can cause damage to the heating system and the corresponding structure if not operated during sub-freezing temperatures. Furthermore, water can create corrosion as the temperature of the water is increased. Also, water is limited with respect to a maximum temperature at which the heating system can be operated as water will boil at 212° F. (100° C.).

In an attempt to alleviate these operational limitations of using water as the heat transfer medium, some heating systems have added either ethylene or propylene glycol to the water to both lower the freezing point and raise the boiling point of the heat transfer medium. Alcohol has also been added to water for the same purposes, but alcohol is very volatile and flammable, and can provide a dangerous solution for use as a heat transfer medium.

Heat transfer mediums should ideally be fluid and operable at a broad range of temperatures, have low viscosities to facilitate pumping the heat transfer medium through the heating system particularly at low temperatures, and provide an effective rate of heat transfer. Furthermore, the heat transfer fluid should have a sufficiently low freezing point, decompose slowly during use, and not corrode the system in which the heat transfer fluid is being utilized. In addition, it would be desirable that the heat transfer fluid be environmentally friendly in case the fluid is spilled into the environment. Accordingly, density, thermal conductivity, specific heat, kinematic viscosity, environmental impact, toxicity, flammability and corrosive nature are specific parameters that are important in the effectiveness of a heat transfer medium.

Choosing an appropriate heat transfer fluid can be operable to maximize the effectiveness and the efficiency of a heating system whether used in residential, industrial or commercial applications. An efficient transfer of heat energy from a heating source to an area to be heated will reduce heating costs and reduce the emission of hydrocarbons into the atmosphere.

A heat transfer fluid is disclosed in U.S. Pat. No. 3,407,142, granted on Oct. 27, 1968, to Robert S. McCord and assigned to McDonnell Douglas Corporation in which the heat transfer fluid for use in low temperature conditions, particularly with aircraft and electronic systems. This heat transfer fluid consists essentially of a tetraalkyl orthosilicate and a polyalkylene glycol diether to provide a novel cooling fluid for use in aircraft and electronic systems at very low temperatures.

A heat transfer system is disclosed in U.S. Pat. No. 7,476,332, granted on Jan. 13, 2009, to Hari Babu Sunkara and assigned to E. I. Du Pont De Nemours & Company in which the heat transfer fluid comprises a polytrimethylene homo- or copolyether glycol with a blending component selected from the group consisting of ethylene glycol, diethylene glycol, polyalkylene glycol copolymers of ethylene oxide and propylene oxide, vegetable oils, aromatic compounds, mineral oil, silicone fluids, and mixtures thereof. This heat transfer fluid is intended to be used in automobiles, industrial heat exchangers, heat recovery units, refrigeration units, solar panels, cooling towers, transformers, and heating radiators.

U. S. Patent Application Publication No. 2008/0315152, filed by Glendon C. Daly and published on Dec. 25, 2008, discloses a heat transfer fluid comprised of glycerin or glycerol. In one embodiment, the glycerin contains greater than 95% by weight glycerol, or can be crude glycerin. This heat transfer fluid is intended for use in heating and cooling systems applicable to buildings, whether residential, industrial or commercial.

It would be desirable to provide a heating system utilizing a heat transfer fluid that maximizes the efficiency of the operation of the heating system for use in residential, industrial or commercial applications.

SUMMARY OF THE INVENTION

It is an object of this invention to provide an economical and operatively efficient heating system for heating a building structure.

It is another object of this invention to provide a blended heat transfer fluid that is highly effective in retaining heat to be transferred from a heating source to a building structure to be heated.

It is a feature of this invention that the blended heat transfer fluid incorporating the principles of the instant invention absorbs heat approximately twice as fast as water.

It is another feature of this invention that the blended heat transfer fluid loses heat more slowly than water.

It is an advantage of this invention that the blended heat transfer fluid will not have substantial amounts of heat loss as the fluid is transported through conduits from the heating source to the building structure to be heated.

It is still another feature of this invention that the blended heat transfer fluid requires multiple circulations around the heating system to transfer heat into the building structure.

It is yet another feature of this invention that the blended heat transfer fluid may require three to twenty-four hours of circulation before elevating the temperature of a building structure to a desired temperature.

It is another advantage of this invention that the blended heat transfer fluid within the heating tank of a heating system will retain heat therein without requiring excessive input from the heating source to maintain temperatures in the fluid.

It is still another advantage of this invention that a heating system can be provided for a building structure without requiring burners that burn petroleum products and the bulky tanks associated with the storage of such products, and without unpleasant odors and unwanted noise from blower motors.

It is still another object of this invention that the heating system can be made into a compact form that would provide heating services for an apartment unit.

It is another feature of this invention that the compact heating system can utilize a heating tank of six gallons or smaller.

It is another advantage of this invention that the compact heating system can utilize a tankless, on-demand water heating systems can be configured as the heating source with the blended heat transfer fluid being substituted for the water and being utilized in a closed loop including a heat exchanger in the residential unit being heated.

It is still another advantage that the compact heating system can be powered through conventional 120 volt household current.

It is yet another object of this invention to provide a blended heat transfer fluid from about 25% to 55% by volume of a polyol having five or less pendant hydroxyl groups, and from about 45% to 75% by volume of a polydimethylsiloxane.

It is yet another feature of this invention that the polyol having five or less pendant hydroxyl groups includes from about 5% to 15% glycerin, and from about 20% to 40% propylene glycol, wherein the glycerin and the propylene glycol form a blended glycol component.

It is a further object of this invention to provide a heating system, which is durable in construction, inexpensive of manufacture, carefree of maintenance, facile in assemblage, and simple and effective in use.

These and other objects, features and advantages are accomplished according to the instant invention by providing a heating system that combines a heat source for applying heat energy to a supply of heat transfer fluid including a polyol having five or less pendant hydroxyl groups and a polydimethylsiloxane and a pump that moves the heat transfer fluid through conduits to a heat exchanger. In one configuration, the heating system has a primary circuit including the heat source, delivery line, pump, heat exchanger and return line, and a sub-circuit including a bypass line interconnecting the delivery line and the return line to provide a flow path bypassing the heat source. The sub-circuit includes the bypass line, a portion of the delivery line, the pump, the heat exchanger, and a portion of the return line. Control valves and a control mechanism direct the flow of fluid between the primary and sub-circuit. The heat transfer fluid is a blended mixture of glycerin, propyl glycol and silicone.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
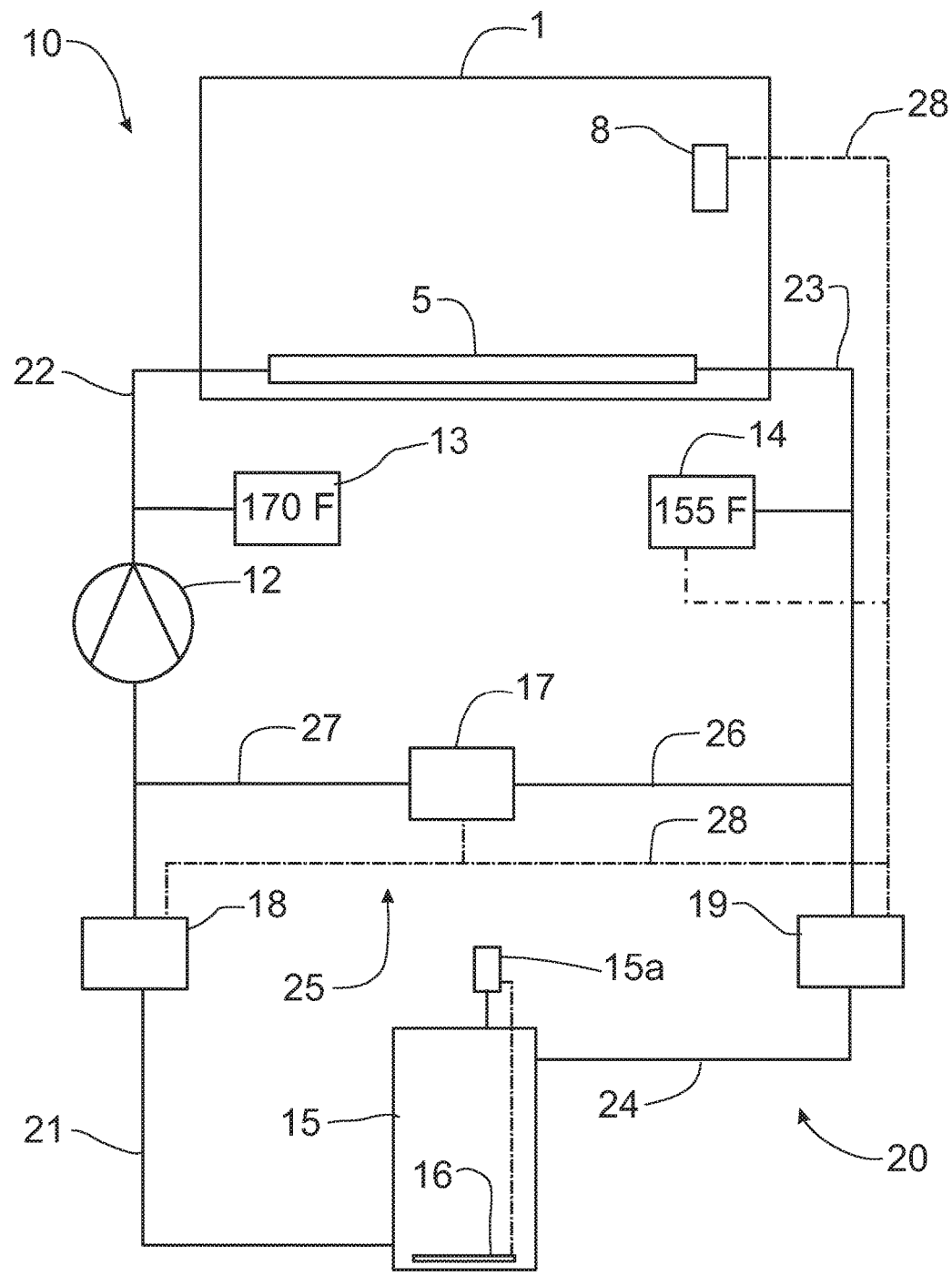
FIG. 1 is a schematic diagram of a heating system incorporating the principles of the instant invention to heat a building structure.

Referring now to the drawings, a heating system for use in residential, industrial and commercial buildings, incorporating the principles of the instant invention, can best be seen. One skilled in the art will understand that the principles of the instant invention are not limited to a particular type of heating source or utilization in any specific type of building or environment. The examples of the type of heating source and application thereof noted below are preferable, but not required for the application of the instant invention. The instant invention includes a novel heat transfer medium, as well as a novel heating system for operation of the heat transfer medium between the heat source and the area to be heated.

As best seen in FIG. 1, the heating system 10 can be utilized to heat a building space 1 through a baseboard heat exchanger 5. The heating system 10 includes a heating source 15, which can be a conventional water heater powered by an electrical resistance coil 16 as the source of the heat energy applied to the heat transfer medium carried within the heat source 15. One skilled in the art will recognize that the source of heat energy could also be a solar collector, gas (natural or propane), or other fuels. The heating system 10 also includes a pump 12, thermometers 13, 14, thermostat 8, and three valves 17, 18 and 19.

The heating system 10 further includes conduit arranged to form two circuits 20, 25 for the operation of the heating system 10 carrying the novel heat transfer medium described in greater detail below. The first circuit 20 is the primary circuit and circulates the heat transfer fluid from the heating source 15 through line 21 and the valve 18 to the pump 12. The pump 12 operates to circulate the heat transfer fluid through both circuits 20, 25 and pushes the heat transfer fluid through line 22 into the baseboard heat exchanger 5 in the building area 5 to be heated by the heating system 10. The return line 23 returns the heat transfer fluid from the baseboard heat exchanger 5 through the valve 19 and line 24 back to the heat source 15. The first thermometer 13 detects the temperature of the heat transfer fluid through the delivery line 22, while the second thermometer detects the temperature of the heat transfer fluid through the return line 23.

The second circuit 25 is a sub-circuit that bypasses the heat source 15 such that the pump 12 circulates the heat transfer fluid through line 22 to the baseboard heat exchanger 5 and then to the return line 23. With the valves 18 and 19 closed, and the valve 17 opened, the sub-circuit 25 passes through line 26 to the opened valve 17, then through line 27 to the pump 12. As one of ordinary skill in the art would readily recognize, the three valves 17-19 work in concert to control which circuit 20, 25 is being utilized. When the valves 18, 19 are open, valve 17 would be closed to prevent the heat transfer fluid from moving through lines 26 and 27. Conversely, when valve 17 is open, valves 18 and 19 are closed to force the heat transfer fluid through lines 26 and 27, thereby bypassing the heat source 15 for the purposes to be described in greater detail below.

The operation of the valve 17-19 is controlled through the building thermostat 8 which is electrically coupled to the valves 17-19 by appropriate wiring 28. When the building thermostat 8 is calling for more heat (in response to the ambient air temperature being below the desired temperature setting), the valves 18 and 19 are opened and valve 17 is closed to force the flow of fluid through the heat source 15 and acquire heat transfer fluid with a higher temperature. A thermostat 15a is operatively coupled to the heat source 15 to operate the heating element 16 when the temperature of the heat transfer fluid within the heat source 15 is lower than about 170 to 190 degrees F. Preferably, the pump 12 is operated continuously circulating the heat transfer fluid through one of the circuits 20, 25 during operation of the heating system 10. When the building thermostat 8 stops calling for heat (in response to the ambient temperature being at or above the desired temperature setting), the signal from the building thermostat 8 closes the valves 18 and 19, opens valve 17, and circulates the heat transfer fluid through the sub-circuit 25 until more heat is desired according to the thermostat 8.

Alternatively, the operation of the valves 17-19 can be controlled through the second thermometer 14, which would be configured as a thermostat 14 in concert with the building thermostat 8, both of which would be electrically coupled to the valves 17-19 by appropriate wiring 28. The pump 12 is operated constantly, circulating the heat transfer fluid through the appropriate circuit 20, 25, as defined by the operation of the second thermostat 14 and the room thermostat 8.

In this alternative embodiment, the heating system 10 operates to first build up the temperature of the heat transfer fluid within the system 10 through operation of the heating element 16. Once the heat transfer fluid has been heated to the desired temperature as controlled by the thermostat 15a, the heating system 10 can be operated to circulate the heat transfer fluid to the building area 1 to be heated. The room thermostat 8 senses the temperature of the building area 1 below the desired setting and calls for heat to be delivered to the baseboard heat exchanger 5. The constantly operating pump 12 extracts the heat transfer fluid from the bottom of the heat source 15 through line 21 and circulates the heat transfer fluid to the baseboard heat exchanger 5 for return to the top of the heat source 15 through circuit 20.

As long as the temperature of the heat transfer fluid passing through the return line 23 is below a predetermined temperature, such as 155 degrees F. for example, as sensed by the second thermostat 14, the valves 18 and 19 are opened and the valve 17 is closed to circulate the heat transfer fluid through the primary circuit 20. The cooled heat transfer fluid returns to the top of the heat source 15 through the return lines 23, 24, while heated transfer fluid is drawn from the bottom of the heat source 15 and sent to the baseboard heat exchanger 5 to continue warming the building area 1.

Once the second thermostat 14 shows that the temperature of the heat transfer fluid in the return line 23 is at or above the predetermined temperature, as sensed thereby, the thermostat 14 closes the two valves 18, 19 and the lines 21, 24, respectively, and simultaneously opens valve 17 to cause the heat transfer fluid to circulate through the sub-circuit 25. When sufficient heat energy has been extracted from the heat transfer fluid to lower the temperature in the return line 23 below the second predetermined temperature as sensed by the second thermostat 14, the second thermostat 14 will open valves 18 and 19, while closing valve 17, allowing the pump 12 to draw warm heat transfer fluid from the bottom of the heat source 15. Accordingly, the heat transfer fluid moves through the primary circuit 20 when both the building thermostat 8 and the second thermostat 14 call for more heat. If either of the thermostats 8, 14 is not calling for more heat, the heat transfer fluid circulates through the sub-circuit 25.

In a further alternative configuration, the pump 12 can be operated by the building thermostat 8, activating the pump 12 to circulate heat transfer fluid through whichever circuit 20, 25 is identified by the second thermostat 14. Thus, if the room thermostat 8 calls for heat and the temperature of the heat transfer fluid in the return line 23 is still above the second predetermined temperature as sensed by the second thermostat 14, the valves 18, 19 can remain closed to cause the heat transfer fluid to circulate through the sub-circuit 25 until the temperature of the heat transfer fluid in the return line 23 drops below the second predetermined temperature. Once both the room thermostat 8 and the second thermostat 14 call for heat, the valves 18 and 19 are opened and valve 17 is closed to draw warmer heat transfer fluid from the bottom of the heat source 15.

The specific heat retention properties of the heat transfer fluid, as will be described in greater detail below, permit the operation of the heat system 10 to circulate the heat transfer fluid through the sub-circuit 25 until sufficient heat energy has been extracted to justify opening the primary circuit 20 to draw warmer heat transfer fluid from the heat source 15. These same heat retention properties of the heat transfer fluid also increase the operative efficiency of the heat source 15. While the heat transfer fluid is moving around the sub-circuit 25, the temperature of the heat transfer fluid retained within the heat source 15 remains stable without requiring frequent operation of the heating element 16 to maintain the temperature. As a result, the cost of heating the building area 1 is decreased as compared to conventional hot water heating systems.

The heat transfer medium/fluid is a blended mixture including glycerin (glycol), propylene glycol and a silicone. Glycerin provides uniform and sustainable temperatures in the heat transfer fluid. Glycerin has a low coefficient of thermal expansion, but has a viscosity of 1.412 Pa·s, which is hard to pump, particularly if temperatures are below 70° F. Both propylene glycol and glycerin are polyol compounds that include three pendant hydroxyl groups; however, polyol compounds having up to and including five pendant hydroxyl groups may be utilized in the heat transfer fluid alternatively, or in addition to, the propylene glycol and/or glycerin if blended in manner to achieve a solution that can be pumped efficiently through conduits of the heating system 10. Propylene glycol has a lower viscosity of 0.042 Pa·s and when mixed with the glycerin effectively reduces the overall viscosity of the mixture. Propylene glycol also has a low coefficient of thermal expansion and can be used to transfer heat at relatively high temperatures. In exemplary embodiments, the silicone may be a polydimethylsiloxane (e.g., WACKER® AK1000 silicone fluid) that has exceptionally low volatility and high thermal stability. Silicones such as polydimethylsiloxanes resist degradation from heat and maintain excellent temperature stability and heat transfer characteristics.

Figure 2:
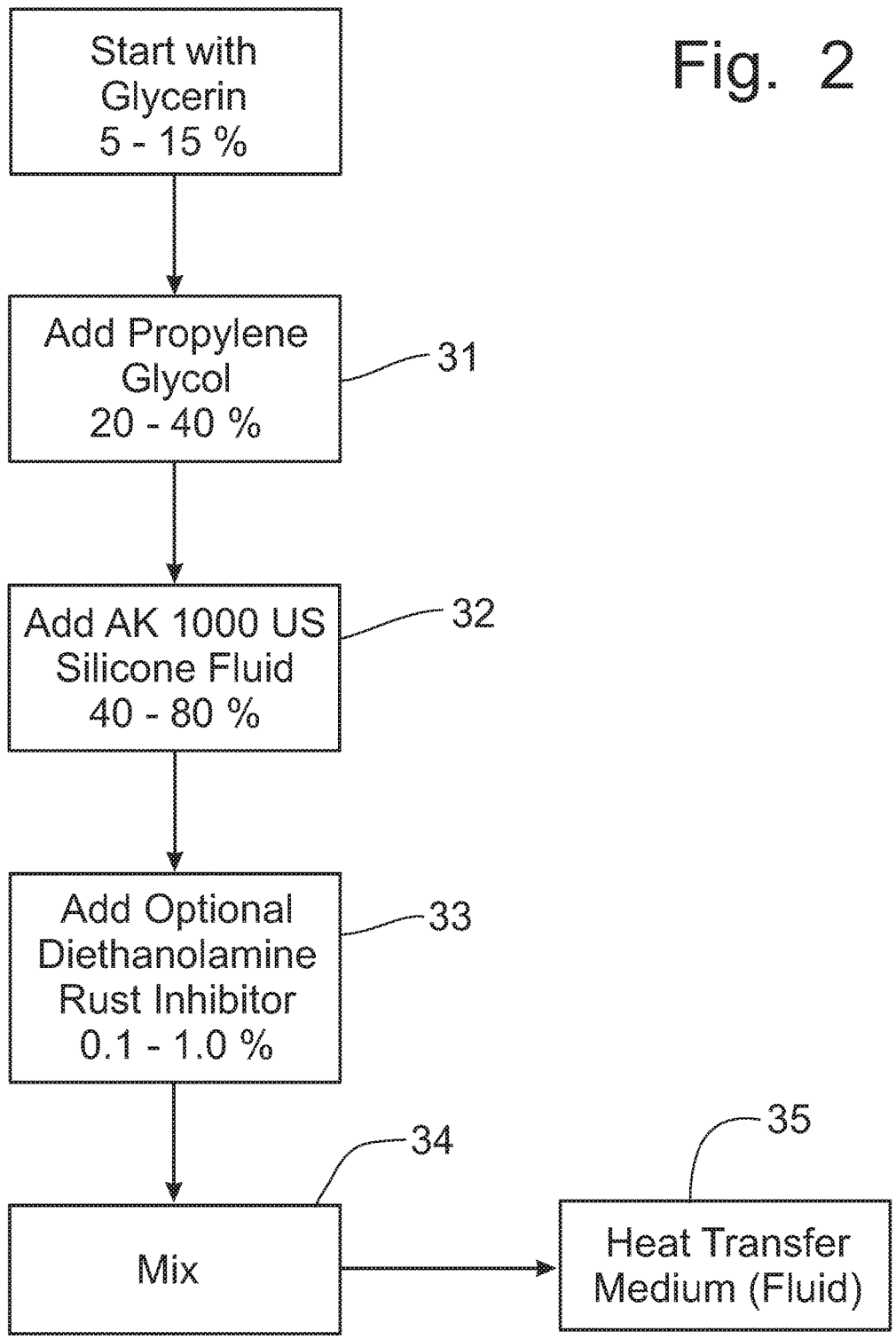
FIG. 2 is a process flow diagram to create and operate a heating system incorporating the principles of the instant invention.

Mixing these three components in the manner described in greater detail below creates a clear pourable liquid that enables a more efficiently operating heating system 10, resulting in low cost, long term heat transfer fluid for use in residential, commercial or industrial applications. As depicted in FIG. 2, the less viscous propylene glycol is added at step 31 to the glycerin with approximately five (5)

to fifteen (15) percent by volume of the total mixture being glycerin and approximately twenty (20) to forty (40) percent by volume of the total mixture being propylene glycol. The resulting mixture has an overall lower viscosity. Next, the silicone (e.g. a polydimethylsiloxane) is added at step 32 to the mixture of glycerin and propylene glycol with approximately forty (40) to eighty (80) percent by volume of the total mixture being a silicone. An optional rust inhibitor can be added at step 33 to the mixture to inhibit tarnish on structural components of the heating system 10. Diethanolamine (DEA) in the amount of approximately one-tenth (0.1) to one (1.0) percent by volume of the total mixture can be added to inhibit rust formation from the circulation of the mixture.

As one example, the mixture of the heat transfer medium can start with ten (10%) percent by volume of glycerin (99.7% USP Kosher (CAS#56-81-5) sold by Acme-Hardesty Company of Blue Bell, Pa.), to which is added thirty (30%) percent by volume of propylene glycol (USP Kosher (CAS#57-55-6) sold by Acme-Hardesty Company of Blue Bell, Pa.). Then, sixty (60%) percent by volume of silicone (WACKER® AK1000 Silicone Fluid sold by Wacker Chemical Corporation of Adrian, Mich.) is added to the glycerin/propylene glycol solution to create the heat transfer fluid. In the event the aforementioned optional rust inhibitor is added to the mixture, the percentage of silicone fluid is reduced to fifty-nine and one-half (59.5%) percent by volume and one-half (0.5%) percent of the diethanolamine (DEA) completes the composition of the heat transfer fluid.

Since the silicone fluid is not soluble with and will not homogeneously mix with the glycerin/propylene glycol mixture, a mixing of the final composition will be required at step 34 to suspend the glycerin/propylene glycol within the silicone fluid and create the blended heat transfer medium (fluid) at step 35. If the glycerin/propylene glycol/silicone emulsion is not in fluid movement, the glycerin/propylene glycol will separate from the silicone fluid; however, the mixing of the heat transfer fluid caused by the pump 12, as reflected in the process defined in FIG. 3 at step 38, will provide sufficient mixing to maintain the glycerin/propylene glycol/silicone in emulsion. If the heat transfer fluid is mixed in the order noted above, i.e. glycerin, then propylene glycol and then silicone fluid, the result will be a clear pourable heat transfer fluid.

Figure 3:
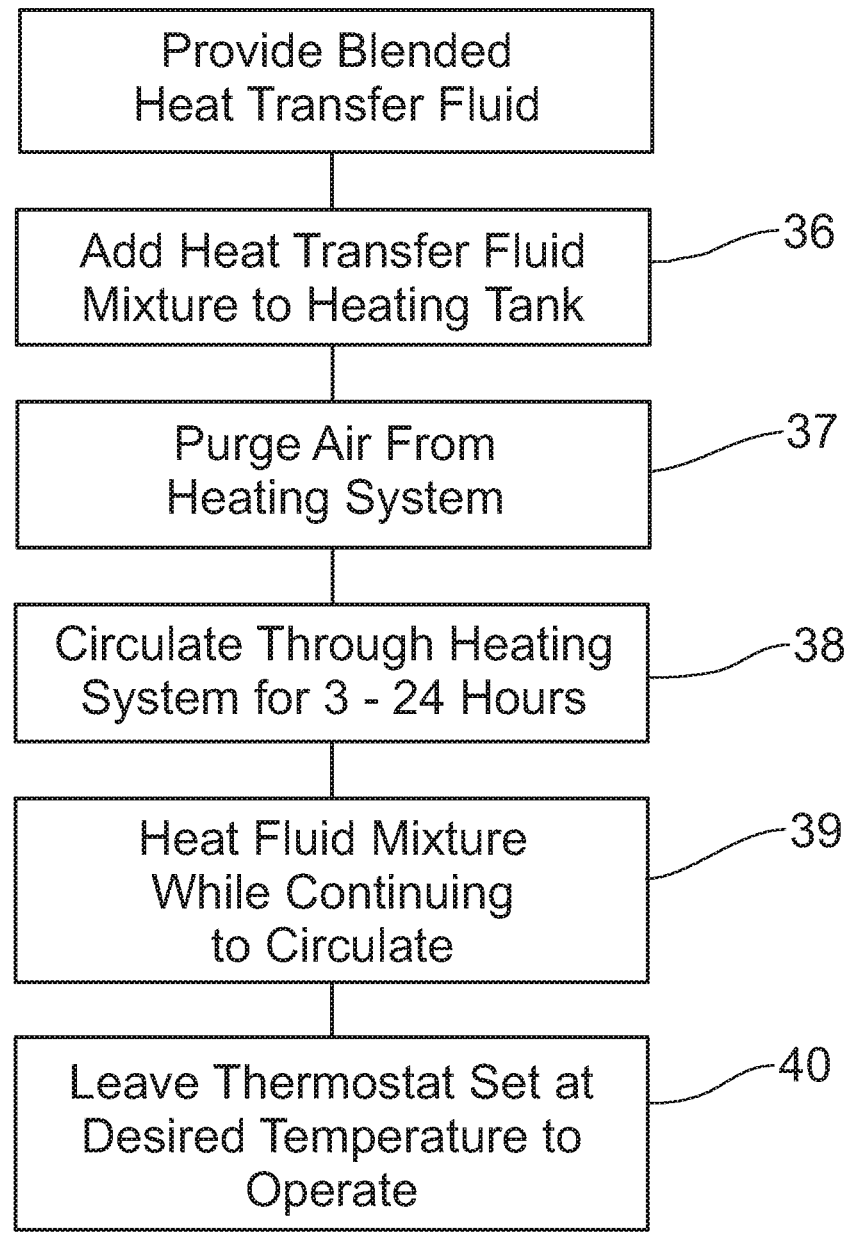
FIG. 3 is process flow diagram for creating the heat transfer medium for use in the heating system depicted in FIG. 1.

Accordingly, with reference to FIGS. 1 and 3, the blended heat transfer fluid mixed as described above and depicted in FIG. 2, is added to the heat source 15 at step 36. Preferably, the heat source 15 is a converted hot water heater that has a heating element 16 to provide a source of heat energy for the heat transfer fluid. A modification of the hot water heater to remove the inlet line at the top of the conventional hot water heater for the introduction of cold water into the tank, and to exchange the conventional thermostat with a commercial thermostat that will permit higher operating temperatures than are typically permitted with conventional hot water heaters. The tank will be further converted to utilize a return line 24 at the top of the tank 15 and an outlet line 21 at the bottom of the tank 15.

Air is then purged from the circuits 20, 25 at step 37 and the heat transfer fluid is circulated at step 38 through the primary circuit 20. If the blended heat transfer fluid has settled and, therefore, needs to be re-suspended, circulation of the heat transfer fluid at step 38 through the primary circuit 20 is recommended for 3 to 24 hours before adding heat energy to the heat transfer fluid at step 39. The heating element 16 is powered to add heat energy to the heat transfer fluid until the temperature of the heat transfer fluid within the heat source tank 15 is in the recommended range of 170 to 190 degrees. When the thermostat 15a detects the temperature of the heat transfer fluid at the desired temperature, the heating element 16 is de-powered until additional heat energy is required as detected by the thermostat 15a. The heat retention properties of the blended heat transfer fluid are sufficient that operation of the heating element 16 is infrequent, particularly when the heating system 10 is operating through the sub-circuit 25.

One skilled in the art will recognize that the excellent heat retention properties of the blended heat transfer fluid makes extracting heat energy from the heat transfer fluid at the baseboard heat exchanger 5 more difficult than is typically encountered with conventional hot water heating systems. Accordingly, raising the temperature of the ambient air within the building area 1 will likely take a longer period of time than is experienced with conventional hot water heating systems. Thus, to continue the extraction of heat energy from the heat transfer fluid, the heating system 10 operates to circulate the heat transfer fluid through the sub-circuit 25 as long as adequate heat energy is retained therein without forcing the heat transfer fluid to pass through the heat source 15.

At step 40, the recommended procedure is to set the room thermostat 8 at the desired temperature and leave the room thermostat 8 setting unchanged while the heating system 10 is operating. With the heat retention properties of the heat transfer fluid, the circulation of the heat transfer fluid through the sub-circuit 25 allows an adequate extraction of heat energy to maintain the temperature of the ambient air in the building area 1 at a stable level while minimizing the need for operation of the heating element 16 within the heat source 15. When the heating season is completed, the heating system 10 can be shut down until heat is again required during the next heating season. At that point, the heating system 10 should start at step 38 to affect a re-mixing of the heat transfer fluid by circulating the heat transfer fluid for approximately 3-24 hours before initiating the operation of the heating element 16 at step 39.

The heat transfer fluid blended according to the directions set forth in greater detail above provides a clear pourable fluid that is easy to circulate through the heating system 10, is non-toxic, non-corrosive, non-degrading, and environmentally friendly and has a long operative life. The heating system 10 can be used in conjunction with a baseboard heat exchanger 5, as described above, but can also be used with a forced air apparatus in which a fan blows ambient air over the heat exchanger to accelerate the extraction of heat from the heat transfer fluid. The heating system 10 can also be used with radiant heating systems and can be used with appropriate plumbing to heat a driveway to eliminate snow and/or ice on the driveway.

One skilled in the art will also recognize that the heating system 10 as depicted in FIG. 1 with only one sub-circuit 25 can be provided with multiple sub-circuits 25. For example, a large house can be zoned with a sub-circuit 25 being applicable for each respective zone in the house by branching off the delivery line 21 and the return line 24 between the heat source 15 and the control valves 18, 19, such that each sub-circuit 25 would have a separate set of control valves 17-19 and pump 12 that are in flow communication with the central heat source 15. The size of the heat source tank 15 will depend on the number of sub-circuits 25 utilized in the heating system 10. A thirty gallon tank 15 should be sufficient for most single zone residential applications, while a fifty gallon tank 15, or even larger, would be desirable for use in multiple zone applications.

Figure 4:
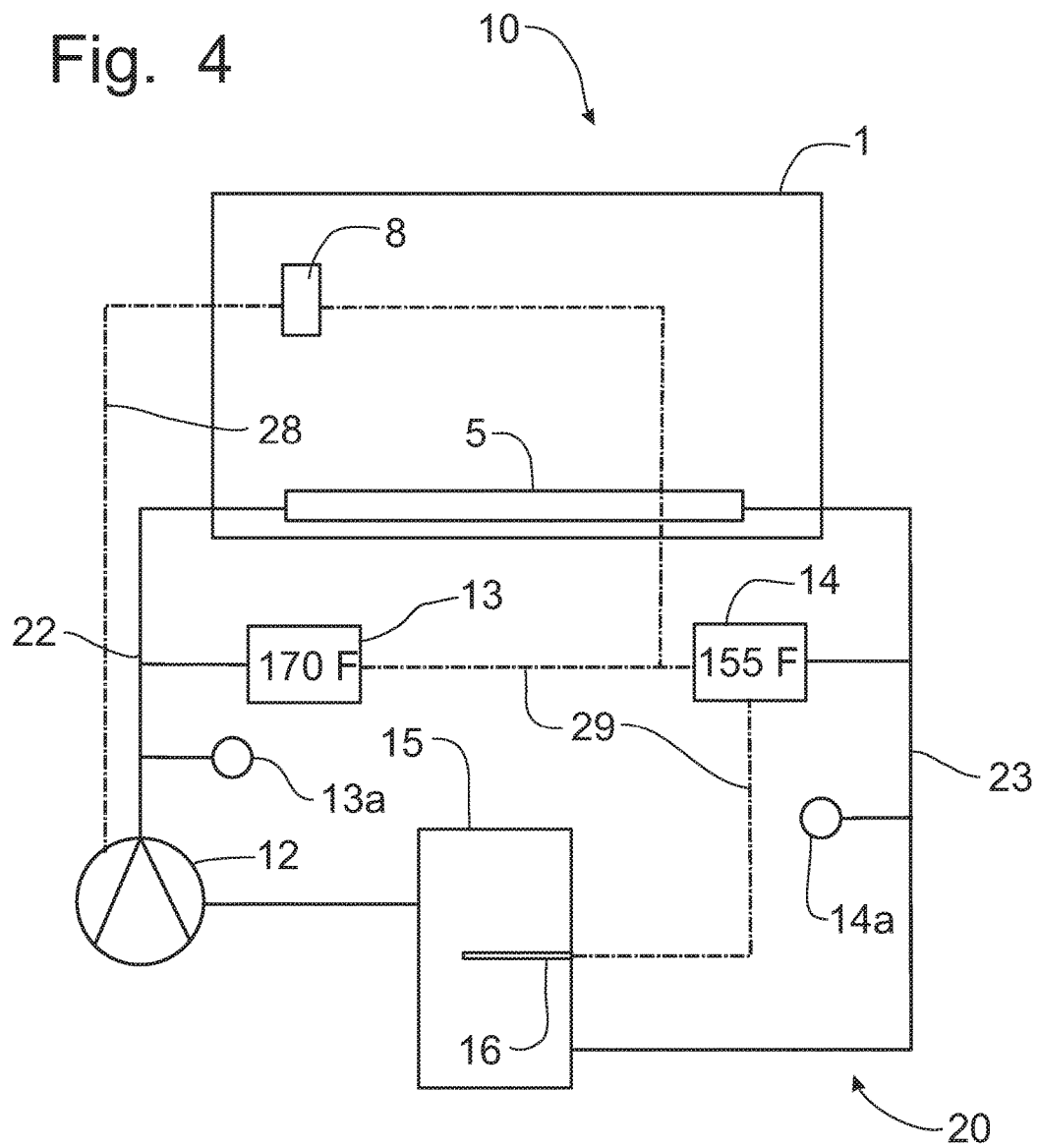
FIG. 4 is a schematic diagram of a compact heating system incorporating the principles of the instant invention to heat a small residential structure.

A compact configuration of the heating system 10 is depicted in FIG. 4. The heat source tank 15 can be of the type that can be connected electrically to household current (120 volt) and can be of any appropriate size that will provide adequate heat transfer into the structure being heated. For example, a six to ten gallon tank 15 filled with the heat transfer fluid configured as shown in FIG. 4 has been tested and provided adequate heat for a 900 square foot structure to maintain temperatures at 73° F. at an average cost of approximately $0.75 per day for the months of October through December in central Pennsylvania.

In the configuration shown in FIG. 4, a six gallon tank 15 included a heating element 16 that was connected electrically by wiring 29 to the 120 volt electrical system at the structure and to thermostats 8, 13 and 14 placed respectively on the supply line 22 and return line 23 to control the operations of the heating element 16 and the pump 12. The thermostat 8 is also connected to the 120 volt house current and provided a signal via wire 28 to operate the pump 12. Preferably, pressure gauges 13a and 14a are connected to the supply and return lines 22, 23 to monitor any pressure changes within the system 10. The pump 12 is operated sufficiently frequently that the blended heat transfer fluid didn't separate or require re-blending during the period of use. The pumping of the heat transfer fluid to the heat exchanger 5 and then back to the tank 15 provides a closed loop system that maintained temperature in the structure being heated. Smaller tanks 15 can also be configured, including the instant, tankless on-demand water heating systems, in which the heat transfer fluid is substituted for the water and the system is maintained in a closed loop.

Such a compact system depicted in FIG. 4 can be utilized in apartment buildings or condominiums, where each residential unit has its own compact heating system 10 that supplies the heat desired for each particular residential unit. The cost of operating the heating system can be attributed directly to each respective residential unit and controlled directly by each respective unit. One of ordinary skill in the art will recognize that the blended heat transfer fluid incorporating the principles of the instant invention can be used in many different applications where the transfer of heat from a source to a remote source. Exemplary of such applications would be heating systems for residential or commercial use, air conditioning systems for residential or commercial use, solar heating systems, and vehicle cooling systems.

For small five gallon batches of the blended heat transfer fluid, which would be appropriate to use in the compact system depicted in FIG. 4, the blending would be accomplished as follows. Four ounces of the rust inhibitor described above would be added to sixty-four ounces (1.0 gallon or 5.466 pounds) of glycerin in a mixing tank or bucket. Then one hundred-ninety-two ounces (1.5 gallons or 13.08 pounds) of propylene glycol is added to the mixing tank, followed by three hundred-eighty ounces (2.99 gallons or 24.03 pounds) of silicone fluid, as described above, for a total of five gallons of blended heat transfer fluid. If the optional rust inhibitor is not desired, the silicone fluid volume is increased by four ounces to still total five gallons of blended heat transfer fluid.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A heating system, comprising:
   a heat source for applying heat energy to a supply of heat transfer fluid having from 25% to 55% by volume of a polyol having five or less pendant hydroxyl groups and from 45% to 75% by volume of a polydimethylsiloxane;
   conduit to carry the heat transfer fluid to and from said heat source, said conduit including a delivery line in which the heat transfer fluid moves away from said heat source and a return line in which the heat transfer fluid is returned to said heat source;
   a heat exchanger in flow communication with said conduit to extract heat energy from said heat transfer fluid;
   a pump to move said heat transfer fluid through said conduit;
   a primary circuit including said heat source, said delivery line, said pump, said heat exchanger, and said return line;
   a sub-circuit including a bypass line interconnecting said delivery line and said return line to provide a flow path bypassing said heat source, said sub-circuit including said bypass line, a portion of said delivery line, said pump, said heat exchanger, and a portion of said return line;
   control valves in each of said delivery line, said return line and said bypass line to control the flow of heat transfer fluid between said primary circuit and said sub-circuit; and
   a control mechanism connected to said control valves for selectively controlling the operation of said control valves in response to a predetermined condition.

2. The heating system of claim 1 wherein said control mechanism is a thermostat within the area to be heated by said heating system sensing that the ambient temperature within the area to be heated is below a predetermined temperature.

3. The heating system of claim 2 wherein said control mechanism further includes a second thermostat sensing a first temperature of said heat transfer fluid in said portion of said return line, said control valves being operated to open said sub-circuit when said first temperature is greater than a predetermined value.

4. The heating system of claim 1 wherein said polyol having five or less pendant hydroxyl groups comprises:
   from 5% to 15% glycerin; and
   from 20% to 40% propylene glycol,
   wherein said glycerin and said propylene glycol form a blended glycol component.

5. The heating system of claim 4 further comprising a polydimethylsiloxane.

6. The heating system of claim 5 wherein said polydimethylsiloxane is added to said blended glycol component to form said heat transfer fluid.

7. A heating system comprising:
   a heat source for applying heat energy to a supply of heat transfer fluid;
   conduit to carry the heat transfer fluid to and from said heat source, said conduit including a delivery line in which the heat transfer fluid moves away from said heat source and a return line in which the heat transfer fluid is returned to said heat source;
   a heat exchanger in flow communication with said conduit to extract heat energy from said heat transfer fluid;

a pump to move said heat transfer fluid through said conduit; and said heat transfer fluid including a polyol having five or less pendant hydroxyl groups and a polydimethylsiloxane.

8. The heating system of claim 7 wherein said heat source comprises:

a heating element for generating heat energy for absorption by said heat transfer fluid; and a tank for holding a supply of said heat transfer fluid, said tank being less than ten gallons in size.

9. The heating system of claim 8 wherein said tank is less than six gallons in size.

10. The heating system of claim 8 further comprising:

a primary circuit including said heat source, said delivery line, said pump, said heat exchanger, and said return line;

a sub-circuit including a bypass line interconnecting said delivery line and said return line to provide a flow path bypassing said heat source, said sub-circuit including said bypass line, a portion of said delivery line, said pump, said heat exchanger, and a portion of said return line;

control valves in each of said delivery line, said return line and said bypass line to control the flow of heat transfer fluid between said primary circuit and said sub-circuit; and a control mechanism connected to said control valves for selectively controlling the operation of said control valves in response to a predetermined condition.

11. The heating system of claim 7 wherein said heat transfer fluid comprises:

from 25% to 55% by volume of one or more polyols having five or less pendant hydroxyl groups; and from 45% to 75% by volume of polydimethylsiloxane.

12. The heating system of claim 11 wherein said polyol having five or less pendant hydroxyl groups comprises:

from 5% to 15% of glycerin; and from 20% to 40% of propylene glycol, wherein said glycerin and said propylene glycol form a blended glycol component.

13. The heating system of claim 12 wherein said polydimethylsiloxane is added to said blended glycol component to form said heat transfer fluid.

* * * * *